United States Patent
Sabatka et al.

(10) Patent No.: US 12,467,659 B2
(45) Date of Patent: Nov. 11, 2025

(54) ADJUSTABLE DUCT MECHANISM FOR HEATING EQUIPMENT

(71) Applicant: Briggs & Stratton, LLC, Wauwatosa, WI (US)

(72) Inventors: Paul Sabatka, Yigo, GU (US); Brett Shive, San Antonio, TX (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 485 days.

(21) Appl. No.: 17/896,379

(22) Filed: Aug. 26, 2022

(65) Prior Publication Data

US 2023/0062152 A1 Mar. 2, 2023

Related U.S. Application Data

(60) Provisional application No. 63/239,071, filed on Aug. 31, 2021.

(51) Int. Cl.
*F24H 9/12* (2022.01)
*F24H 3/04* (2022.01)

(52) U.S. Cl.
CPC ............ *F24H 3/0417* (2013.01); *F24H 9/12* (2013.01)

(58) Field of Classification Search
CPC ......... F24H 9/12; F24H 3/0488; F24H 3/0417
See application file for complete search history.

(56) References Cited

U.S. PATENT DOCUMENTS 11,709,000 B2 * 7/2023 Hahn ................ B62D 21/20
165/48.1
12,215,894 B2 * 2/2025 Hahn .................... B60P 3/00

FOREIGN PATENT DOCUMENTS

GB 849323 * 9/1960

OTHER PUBLICATIONS

Allmand Maxi Heat MH-1000 Manual dated 2011—https://www.allmand.com/content/dam/allmand/na/en_us/files/manuals/heater/Maxi%20Heat%201000%20Owner%20Op-Parts%20Manual%20(2011-103615).pdf.
Allmand Maxi Heat MH-1000 Manual dated Dec. 2014—https://www.allmand.com/content/dam/allmand/na/en_us/files/manuals/heater/Maxi%20Heat%201000%20Owner%20Op%20Manual%20(2014-104203).pdf.
Allmand Maxi-Heat CPH 1000 Manual dated Dec. 2008—https://www.allmand.com/content/dam/allmand/na/en_us/files/manuals/heater/Conoco%20Phillips%20Maxi-Heat%201000%20Owner%20Op-Parts%20Manual%20(2008-106645).pdf.
Allmand Maxi-Heat Model MH-1000 Manual dated Aug. 2007—https://www.allmand.com/content/dam/allmand/na/en_us/files/manuals/heater/Maxi-Heat%201000%20Parts%20Only%20Manual%20(2008-%20103615).pdf.
Allmand SH-750 Enhanced Flameless Heater Manual dated 2015—https://www.allmand.com/content/dam/allmand/na/en_us/files/manuals/heater/SH-750%20Enhanced%20Flameless%20Heater%20Operator%20Manual%20(2015-107577).pdf.

* cited by examiner

*Primary Examiner* — Alfred Basichas
(74) *Attorney, Agent, or Firm* — Foley & Lardner LLP

(57) ABSTRACT

Outdoor power equipment includes a frame supported by a plurality of wheels and an air heating system. The air heating system includes an air inlet, an air outlet, a heating device configured to heat the air between the air inlet and the air outlet, and an adjustable duct connector fixedly coupled to at least one of the air inlet and the air outlet. The adjustable duct connector includes a base plate, a ring arm slidably coupled to the base plate, and a handle rotatably coupled to the base plate and the ring arm. Rotation of the handle selectively transitions the ring arm between a first position proximate the handle and a second position arranged further from the handle. The adjustable duct connector further (Continued)

includes a locking mechanism configured to secure the ring arm in the first position and the second position.

14 Claims, 12 Drawing Sheets

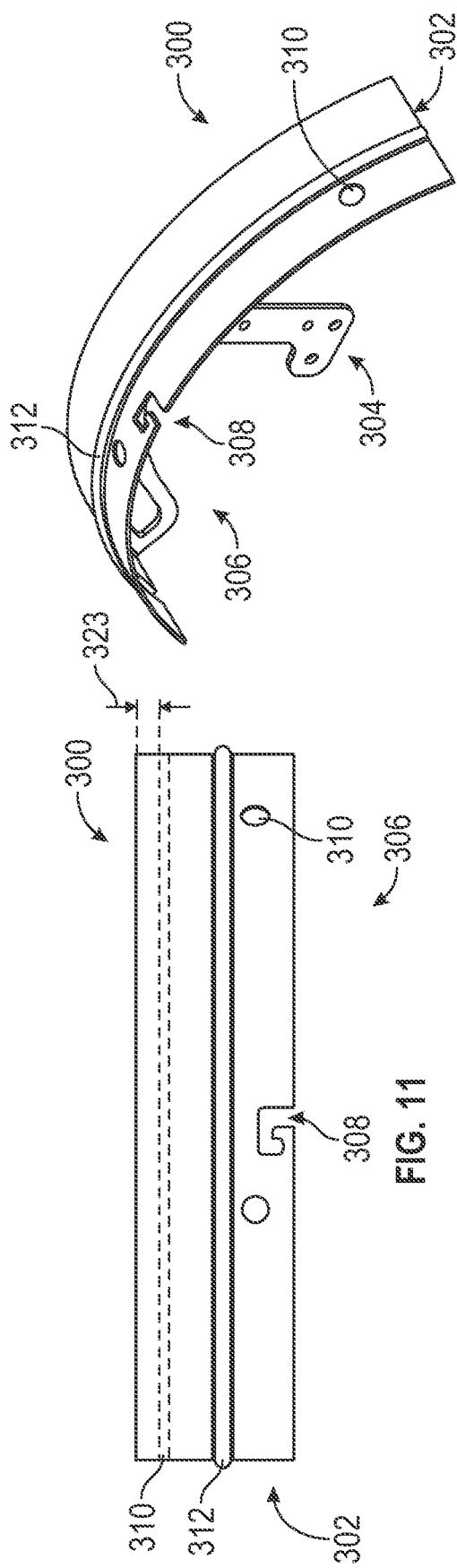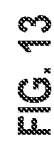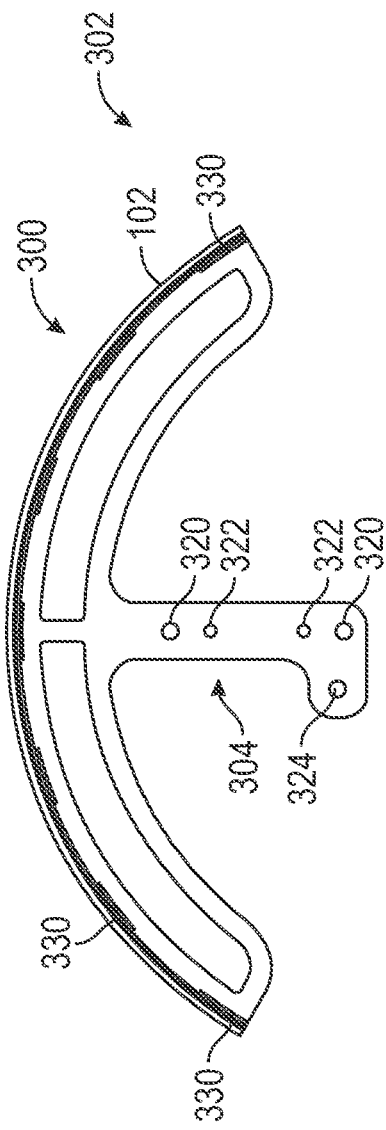

ADJUSTABLE DUCT MECHANISM FOR HEATING EQUIPMENT

CROSS-REFERENCE TO RELATED PATENT APPLICATION

This application claims the benefit of and priority to U.S. Provisional Application No. 63/239,071, filed Aug. 31, 2021, which is incorporated herein by reference in its entirety.

BACKGROUND

The present disclosure relates generally to the field of power equipment. More specifically, the disclosure relates to mobile air heating equipment.

Mobile air heating equipment comes in various sizes and configurations including direct-fired heaters, indirect-fired heaters, electric heaters, wood-burning heaters, modular air heaters, and solar air heaters. Mobile air heating equipment often uses ducts for delivering air and removing air in one or more conditioned spaces. Often, mobile air heating equipment only accommodates a single size of duct at an air inlet and an air outlet.

SUMMARY

At least one embodiment relates to outdoor power equipment including a frame supported by a plurality of wheels and an air heating system. The air heating system includes an air inlet, an air outlet, a fan configured to draw air through the air inlet and expel the air through the air outlet, a heating device configured to heat the air between the air inlet and the air outlet, and an adjustable duct connector fixedly coupled to at least one of the air inlet and the air outlet. The adjustable duct connector includes a base plate, a ring arm slidably coupled to the base plate, and a handle rotatably coupled to the base plate and the ring arm. Rotation of the handle selectively transitions the ring arm between a first position proximate the handle and a second position arranged further from the handle. The adjustable duct connector further includes a locking mechanism configured to secure the ring arm in the first position and the second position.

Some embodiments relates to outdoor power equipment that includes an air inlet, an air outlet, a fan configured to draw air through the air inlet and expel the air through the air outlet, a heating device configured to heat the air between the air inlet and the air outlet, and an adjustable duct connector fixedly coupled to at least one of the air inlet and the air outlet. The adjustable duct connector includes a base plate including a center portion and a plurality of plate arms extending radially outwardly from the center portion and a plurality of ring arms, each being movably coupled to a respective one of the plurality of plate arms. The adjustable duct connecter further includes a handle rotatably coupled to the center portion and each of the plurality of ring arms, so that each of the plurality of ring arms translates along the respective one of the plate arms, in response to selective rotation of the handle, between a first position where an outer periphery of the plurality of ring arms defines a first diameter and a second position where the outer periphery of the plurality of ring arms defines a second diameter, wherein the second diameter is greater than the first diameter.

Some embodiments relates to an adjustable duct connector that includes a base plate, a plurality of ring arms movably coupled to the base plate, and a handle rotatably coupled to the base plate and to each of the plurality of ring arms through a linkage so that rotation of the handle displaces each of the plurality of ring arms between retracted position and an extended position This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which:

FIG. 11 is a top view of a ring arm of the adjustable duct mechanism of FIG. 3.

FIG. 12 is a front view of the ring arm of FIG. 11.

FIG. 13 is a perspective view of the ring arm of FIG. 11.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

The use herein of the term "axial" and variations thereof refers to a direction that extends generally along an axis of symmetry, a central axis, or an elongate direction of a particular component or system. For example, an axially-extending structure of a component may extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component or system.

Referring generally to the figures, described herein is an adjustable duct mechanism for mobile heating equipment. The mobile heating equipment may include a frame, wheels, and an air heating device having an air inlet and an air outlet. Ducts may be selectively coupled to the mobile heating equipment to direct a flow of air. Ducts are available in a large number of sizes and shapes, which can impact the performance of mobile air heating equipment. For example, larger diameter ducts may improve air flow and smaller diameter ducts may restrict air flow. Often, conventional mobile air heating equipment only accommodates a single size (e.g., diameter) of duct. The mobile air heating equipment described herein includes an adjustable duct mechanism configured to couple various sizes of ducts to the mobile heating equipment, without requiring separate duct couplings for each duct size. For example, the adjustable duct mechanism described herein is capable of coupling a 16 inch diameter duct and a 20 inch diameter duct to the mobile heating equipment, according to some embodiments. This may be particularly useful when variously sized ducts are available on a worksite. In some embodiments, the user may quickly adjust the adjustable duct mechanism by rotating a handle. Advantageously, the adjustable duct mechanism described herein can provide an improved user experience by facilitating a secure and reliable connection to ducts of various sizes.

System

Figure 1:
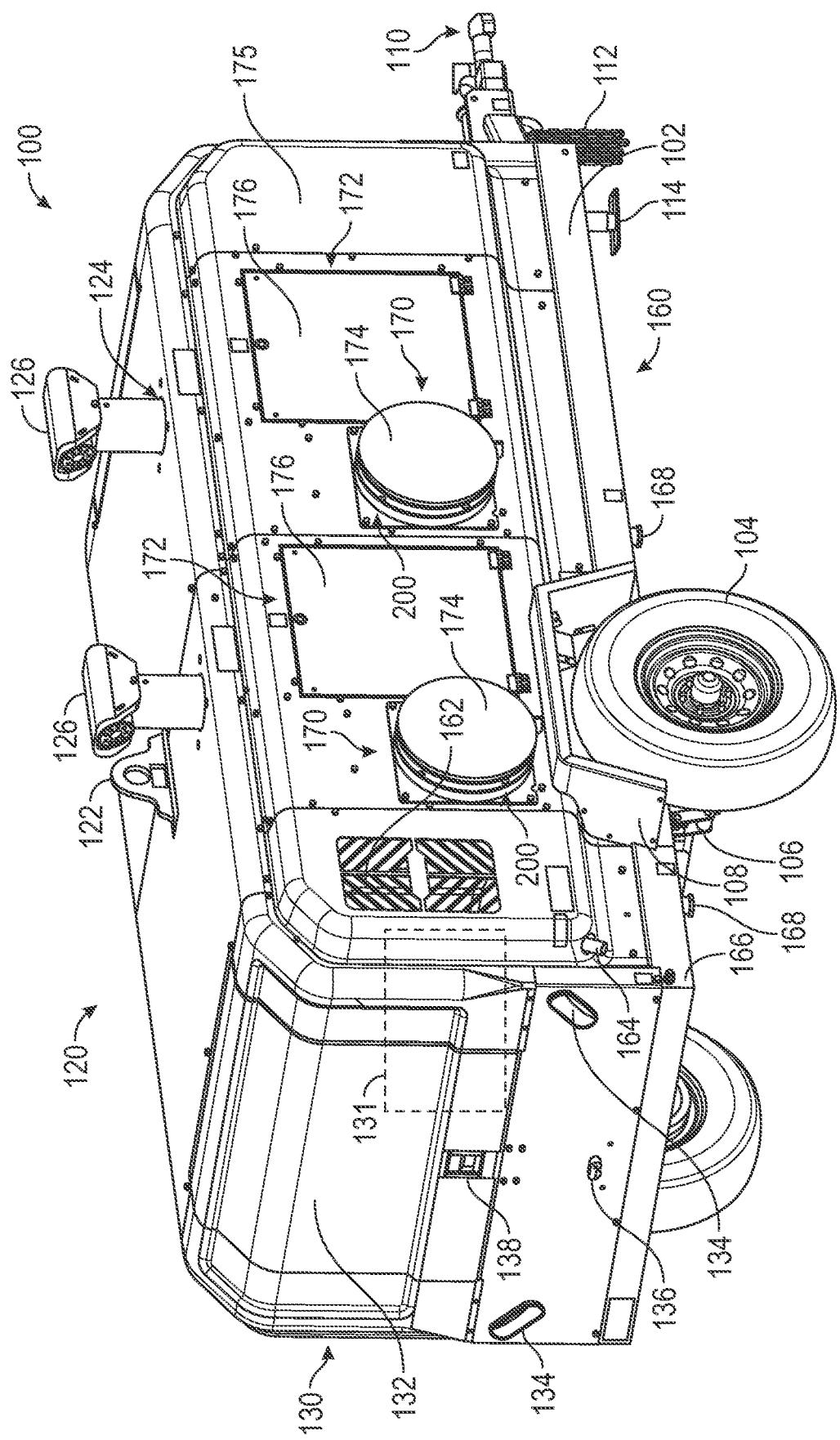
FIG. 1 is a rear perspective view of a mobile air heating equipment, according to an exemplary embodiment.
Figure 2:
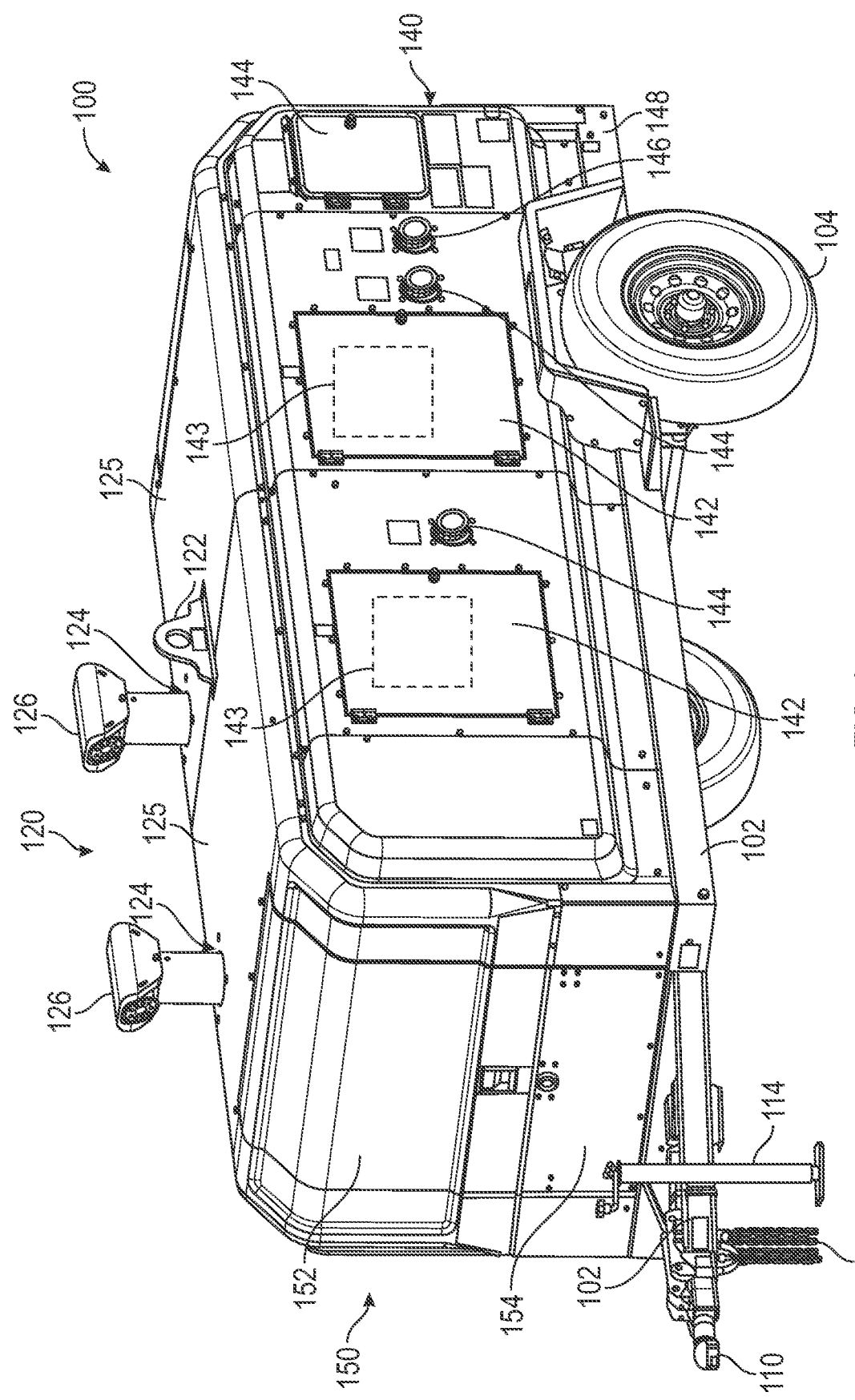
FIG. 2 is a front perspective view of the mobile air heating equipment of FIG. 1.

Referring now to FIGS. 1-2, power equipment (e.g., outdoor power equipment, heating equipment, air heating equipment, air heating unit, air handling equipment, portable air handling equipment, mobile air heating equipment, etc.) is shown as portable air heating unit 100. The portable air heating unit 100 includes a frame 102 and wheels 104. In some embodiments, the frame 102 is supported by two or more wheels 104 that are rotatably coupled to the frame 102 (e.g., using an axle). In some embodiments, the wheels 104 are coupled to the frame 102 through a suspension 106. The suspension 106 can be a leaf spring suspension, independent trailing arm suspension, air ride suspension, magnetic suspension, or other suitable suspension system. In some embodiments, the wheels 104 include a braking system to assist with slowing the portable air heating unit 100 during transit. Wheels 104 are partially covered by fenders 108. The fenders 108 may shield portions of the portable air heating unit 100 from debris thrown towards the portable air heating unit 100 by wheels 104 during transit. The frame 102 includes a coupling portion (e.g., trailer mounting portion, trailer hitch, etc.) shown as trailer coupler portion 110. In some embodiments, the trailer coupler portion 110 is configured to couple the portable air heating unit 100 to self-propelled equipment (e.g., an automobile, truck, tractor, skid steer loader, bulldozer, tow equipment, etc.). The trailer coupler portion 110 may be configured to receive a trailer ball. In some embodiments, the trailer coupler portion 110 is a gooseneck coupler, a fifth-wheel coupler, one of a pintle hook and drawbar coupler, or other suitable trailer coupler mechanisms. The trailer coupler portion 110 includes chains 112 and a jack 114 (e.g., tongue jack, etc.).

In some embodiments, portable air heating unit 100 includes a top portion 120 (e.g., roof, ceiling, etc.). The top portion 120 includes a lifting eye 122 and apertures 124. In some embodiments, the lifting eye 122 is rigidly coupled to the frame 102 and provides a secure coupling location for lifting the portable air heating unit 100. For example, a lifting device (e.g., crane, hoist, helicopter, etc.) may lift the portable air heating unit 100 to, from, and within a worksite using lifting eye 122. In some embodiments, the apertures 124 (e.g., holes) are formed in and extend through top panels 125. In some embodiments, the apertures 124 are formed in the top panels 125 at locations of the top panel 125 that allow the apertures 124 to accommodate various protruding elements of the portable air heating unit 100. For example, chimneys 126 may extend through the apertures 124 to provide ventilation for the onboard air heating systems of the portable air heating unit 100.

Still referring to FIGS. 1-2, in some embodiments, the portable air heating unit 100 includes a rear portion 130 configured to house an engine 131. The rear portion 130 includes an engine compartment door 132, tail lights 134, and a license plate light 136. The engine compartment door 132 is hinged near the top portion 120 and is latched by an engine compartment door latch 138. In some embodiments, the engine compartment door 132 is opened to provide access to an engine compartment that houses the engine 131 that is mechanically coupled to a generator (e.g., alternator, electrical generator, etc.). In some embodiments, the generator is configured to generate electrical power for one or more systems of the portable air heating unit 100 (e.g., control systems, lighting systems, heaters, etc.) using power output from the engine 131.

Referring now to FIG. 2, in some embodiments, the portable air heating unit 100 includes an access side 140 configured to facilitate a user accessing various user interfaces and equipment of the portable air heating unit 100. The access side 140 includes heater equipment access doors 142. In some embodiments, the heater equipment access doors 142 are selectively movable to provide access to at least a portion of the air heating system, shown as on-board heating equipment 143 (e.g., on-board heating units, on-board heating systems, on-board air heating systems, etc.). For example, the heater equipment access doors 142 may be selectively movable to provide access to one or more air heating devices within the on-board heating equipment 143. In some embodiments, the one or more air heating devices 143 can include one or more of an indirect fired heating device, a direct fired heating device, a heater fan configured to draw air in through air inlet areas 170 (see, e.g., FIG. 1) and expel air through the air outlet areas 172, a heater fuel/water separator, a burner configured to combust fuels to generate heat and ultimately heat the air moved by a heater fan, burner controls, fuel valves, dampers, manual temperature controls, heater maintenance ports, burner maintenance ports, electrical cutoff switches, reset buttons, and/or still other on-board heating equipment 143.

In some embodiments, the access side 140 includes heater fuel tank ports 144 and an electrical generator fuel port 146. The heater fuel tank ports 144 may provide access to one or more fuel tanks disposed within the portable air heating unit 100, according to some embodiments. In some embodiments, the one or more heater fuel tanks are configured to provide a supply of fuel to the on-board heating equipment 143. In some embodiments, heater fuel tank ports 144 may be configured to receive liquid fuels (kerosene, gasoline, liquid propane, liquid butane, etc.) gaseous fuels (e.g., natural gas), or solid fuels (e.g., wood, wood pellets, coal, etc.) for use by a burner of the on-board heating equipment 143. In some embodiments, the electrical generator fuel port 146 may be configured to provide access to a fuel tank for the electrical generator and engine 131. In some embodiments, the volume occupied by the electrical generator fuel tank and the electrical generator is at least partially filled with (or replaced by) electrical power storage equipment (e.g., batteries). In such embodiments, one or more portions of the portable air heating unit 100 (e.g., top portion 120) may be at least partially covered by solar panels electrically coupled to the electrical power storage equipment. In some embodiments, the electrical power storage equipment may be configured to supply electrical power to at least one of an electric air heater (e.g., infrared heater, ceramic heater, resistive heater device, etc.) fan, blower, damper, portable air heating unit control system, light emitting device, or external device electrically coupled to the portable air heating unit 100 (e.g., worksite lighting, etc.). In some embodiments, the portable air heating unit 100 is electrically operated and powered. As shown, the portable air heating unit 100 is partially electrically operated and relies on combustible fuels for heating and electrical power generation for onboard electronics (e.g., heating controls, fans, etc.). The access side 140 includes an electrical ground lug 148 configured to be coupled to an electrical ground.

In some embodiments, the portable air heating unit 100 includes a front portion 150 configured to provide storage for various equipment. The front portion 150 may include an upper storage compartment door 152 which selectively encloses an upper compartment configured to store equipment. In some embodiments, the upper storage compartment is configured to store a plurality of ducts suitable for use with the portable air heating unit 100. In some embodiments, the upper storage compartment is configured to store additional equipment that can be used with the portable air heating unit 100 (e.g., cleaning supplies, a spare tire for wheels 104, covers, spare parts, an owners personal belongings, etc.). The front portion 150 further includes a lower storage compartment door 154. The lower storage compartment door 154 may be configured to selectively enclose a lower compartment that is configured to store equipment. In some embodiments, the lower compartment is configured to store maintenance equipment for maintaining the portable air heating unit 100.

Referring now to FIG. 1, the portable air heating unit 100 includes a utility portion 160 (e.g., air handling side, air interface side) configured to facilitate a user accessing inputs and outputs of the portable air heating unit 100. The utility portion 160 includes an engine air exhaust 162. In some embodiments, the engine air exhaust 162 allows air to be exchanged between the engine compartment and the ambient environment. In some embodiments, the engine air exhaust 162 is configured to expel heat generated by the engine 131 using free convection. In some embodiments, the engine air exhaust 162 is configured to expel heat generated by the engine 131 using forced convection (e.g., using a fan). The utility portion 160 includes an engine exhaust 164 and an engine oil drain 166. In some embodiments, the engine exhaust 164 is an outlet for gasses generated during the combustion processes that occur within the engine 131 during operation. In some embodiments, the engine oil drain 166 is configured to selectively drain oil used to lubricate moving parts of the engine 131 and/or the generator. The utility portion 160 includes drains 168. The drains 168 may be configured to drain various fluids and materials stored on the portable air heating unit 100. For example, the drains 168 may be configured to drain a fuel storage tank, chemical storage tank, water storage tank, or other fluid reservoir. In some embodiments, the drains 168 may be configured to selectively drain solid fuels such as pellets, coal, wood, etc.

Still referring to FIG. 1, the utility portion 160 includes air inlet areas 170 (e.g., air inlet locations, air inlets, etc.) and air outlet areas 172 (e.g., air outlet locations, air outlets, etc.), according to some embodiments. The air inlet areas 170 are covered by air inlet covers 174 and air outlet areas 172 are covered by air outlet doors 176. In some embodiments, the portable air heating unit 100 is configured to determine (e.g., using a sensor, a laser sensor, a proximity sensor, etc. in communication with a controller having a processor and memory) if at least one of an air inlet cover 174 and air outlet doors 176 are covering (e.g., obstructing) the air inlet areas 170 and/or the air outlet areas 172. For example, the portable air heating unit 100 may be configured to determine if air outlet door 176 is obstructing air outlet area 172, and may subsequently prevent or stop operation of the heating equipment on-board the portable air heating unit 100 to prevent damage to the equipment (e.g., overheating, inadvertent combustion outside of a combustion chamber, etc.). Each of the air inlet covers 174 is removably coupled to an adjustable duct mechanism 200 (e.g., adjustable duct connector, adjustable duct coupler mechanism, variable duct coupler mechanism, configurable duct coupler mechanism, adjustable duct coupler, etc.).

Figure 3:
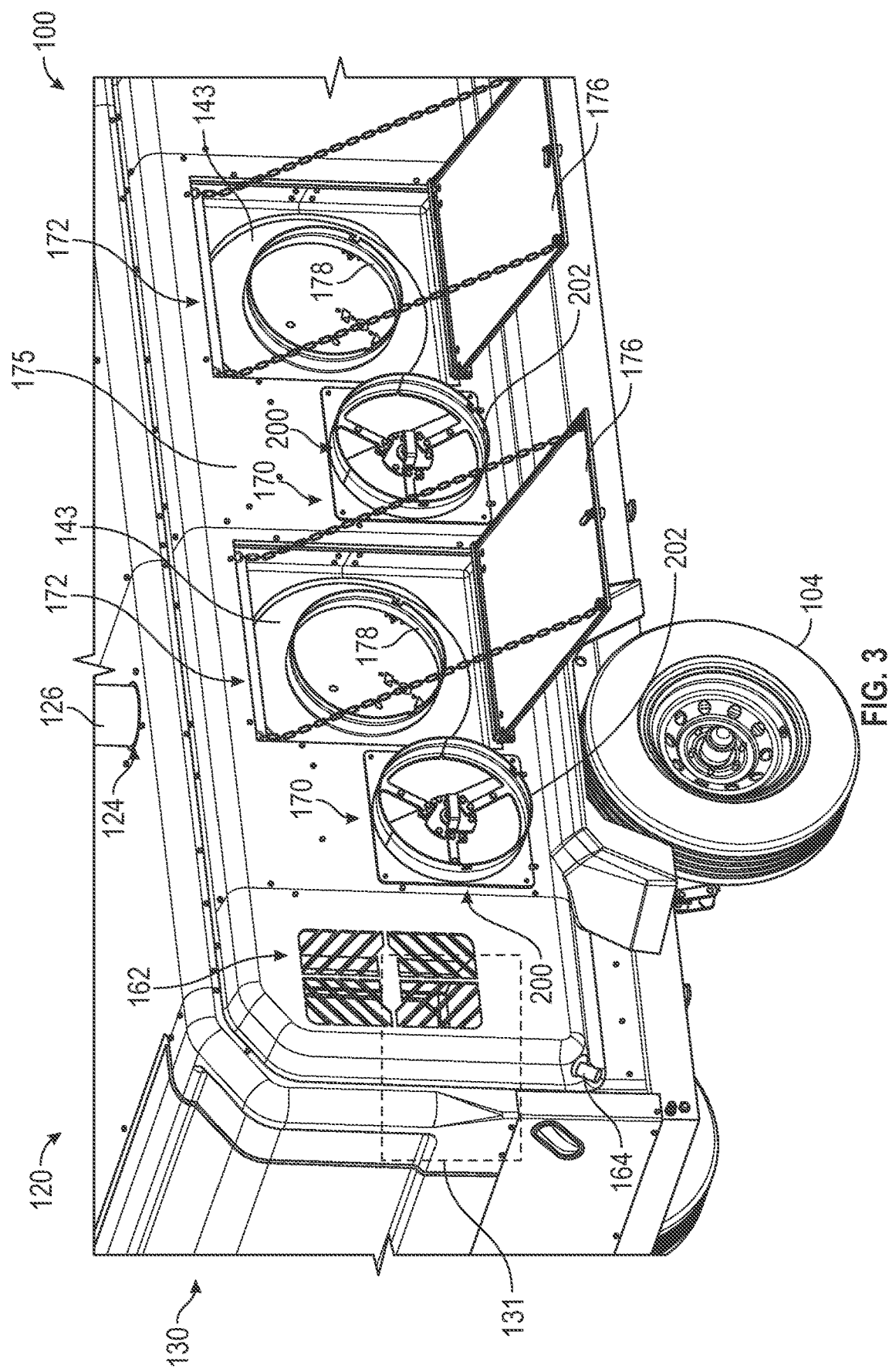
FIG. 3 is a detailed view of the mobile air heating equipment of FIG. 1, showing air outlet and air inlet locations with an adjustable duct mechanism in a first configuration.
Figure 4:
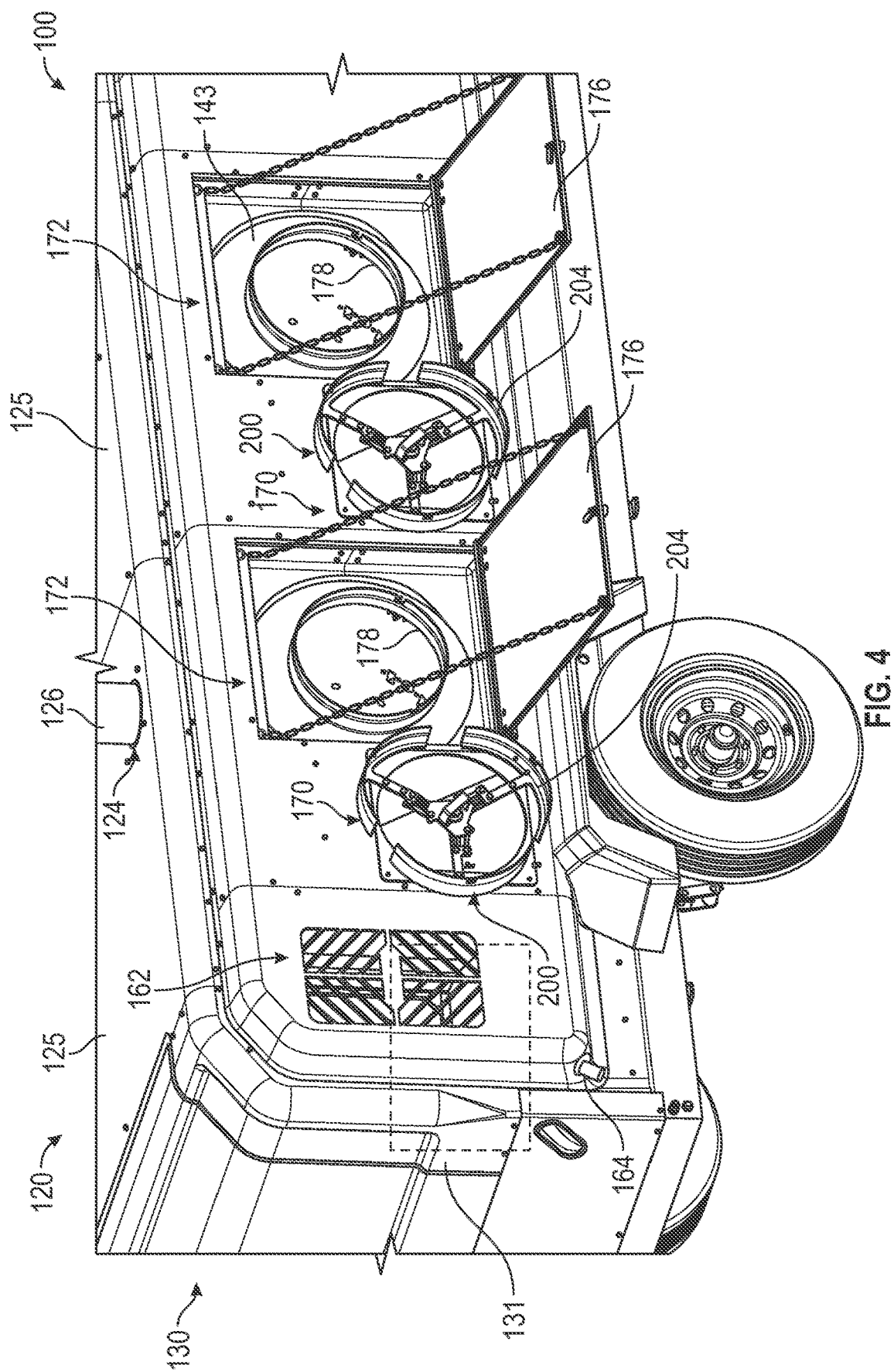
FIG. 4 is a perspective view of the mobile air heating unit of FIG. 1, showing the adjustable duct mechanism of FIG. 3 in a second configuration.

Referring now to FIGS. 3-4, air inlet areas 170 and air outlet areas 172 are depicted uncovered. That is, the air inlet covers 174 are removed from each of the air inlet areas 170 and the air outlet doors 176 are pivotally rotated away from each of the air outlet areas 172. Each of the air inlet areas 170 includes a respective one of the adjustable duct mechanisms 200 arranged externally from a side panel 175 that defines the utility portion 160. Each of the air outlet areas 172 includes a fixed duct coupler or connector 178 (e.g., a rigid flange, a ring, a ring flange, etc.). In the embodiment shown in FIGS. 3 and 4, only the air inlet areas 170 include adjustable duct mechanisms 200. In such embodiments, the adjustable duct mechanisms 200 may be constructed using materials suitable for operation at temperatures at ambient temperature ranges (e.g., approximately −100° F. to 130° F.) that are likely to be experienced by the air inlet areas 170. In some embodiments, air outlet areas 172 include an adjustable duct mechanism 200, and the adjustable duct mechanism 200 may be fabricated using materials suitable for operation over a large temperature range (e.g., approximately −100° F. to 500° F., −100° F. to 1200° F., etc.) to accommodate the operating temperatures likely to be experienced at the air outlet areas 172 before and during operation of the portable air heating unit 100. In some embodiments, each air inlet location 170 and each air outlet area 172 may include one or more adjustable duct mechanisms 200.

Adjustable Duct Mechanism

Referring to FIG. 3, adjustable duct mechanisms 200 are shown in a first position, shown as closed or retracted position 202. In some embodiments, the closed position 202 is configured to accommodate the air inlet cover 174. For example, adjustable duct mechanism 200 may be considered to "accommodate" the air inlet cover 174 by being shaped similarly to the air inlet cover 174 such that the air inlet cover 174 may snap onto or otherwise engage (e.g., screw onto, slide into, slide onto) the adjustable duct mechanism 200 (e.g., with an interference fit) and be held in place by the adjustable duct mechanism 200. In some examples, and as shown in FIG. 3, the closed position 202 is configured to accommodate about a 16 inch diameter duct. In some embodiments, the closed position 202 is configured to accommodate differently-sized ducts, including a 2 inch diameter duct, a 6 inch diameter duct, a 10 inch diameter duct, a 12 inch diameter duct, a 14 inch diameter duct, a 16 inch diameter duct, a 18 inch diameter duct, a square duct, a polygonal duct, an oval duct, a triangular duct, or other suitable sizes and configurations of ducts. In some embodiments, closed position 202 defines the smallest size (e.g., diameter) of duct configured to be coupled to the adjustable duct mechanism 200.

In some embodiments, the adjustable duct mechanisms 200 are each configured to selectively transition from a first position (e.g., position 202) or configuration to a second position or configuration to accommodate differently-sized ducts. For example, in some embodiments, each of the adjustable duct mechanisms 200 is configured to selectively transition between a first position where an outer body of the adjustable duct mechanism 200 defines first diameter and a second position where an outer body of the adjustable duct mechanism 200 defines a second diameter that is different (e.g., larger or greater than) the first diameter. In this way, for example, the adjustable duct mechanisms 200 can be selectively transitioned between the first position and the second position to accommodate different sized ducts. In some embodiments, each of the adjustable duct mechanisms 200 radially expands and retracts an outer body to transition between the first diameter and the second diameter.

Referring to FIG. 4, adjustable duct mechanisms 200 are shown in a second position, shown as an open, expanded, or extended position 204. In some embodiments, the expanded position 204 is the position in which the adjustable duct mechanism 200 is capable of receiving a duct that is larger than the duct received by the adjustable duct mechanism 200 in the closed or first position 202. For example, adjustable duct mechanism 200 may be configured to receive a 16 inch diameter duct in the closed position 202 and a 20 inch diameter duct in the expanded position 204. In still other examples, the adjustable duct mechanism 200 is configured to receive a 12 inch diameter duct in the closed position 202 and a 16 inch diameter duct in the expanded or second position 204. The adjustable duct mechanism 200 is described in greater detail with respect to FIGS. 6-13.

Figure 5:
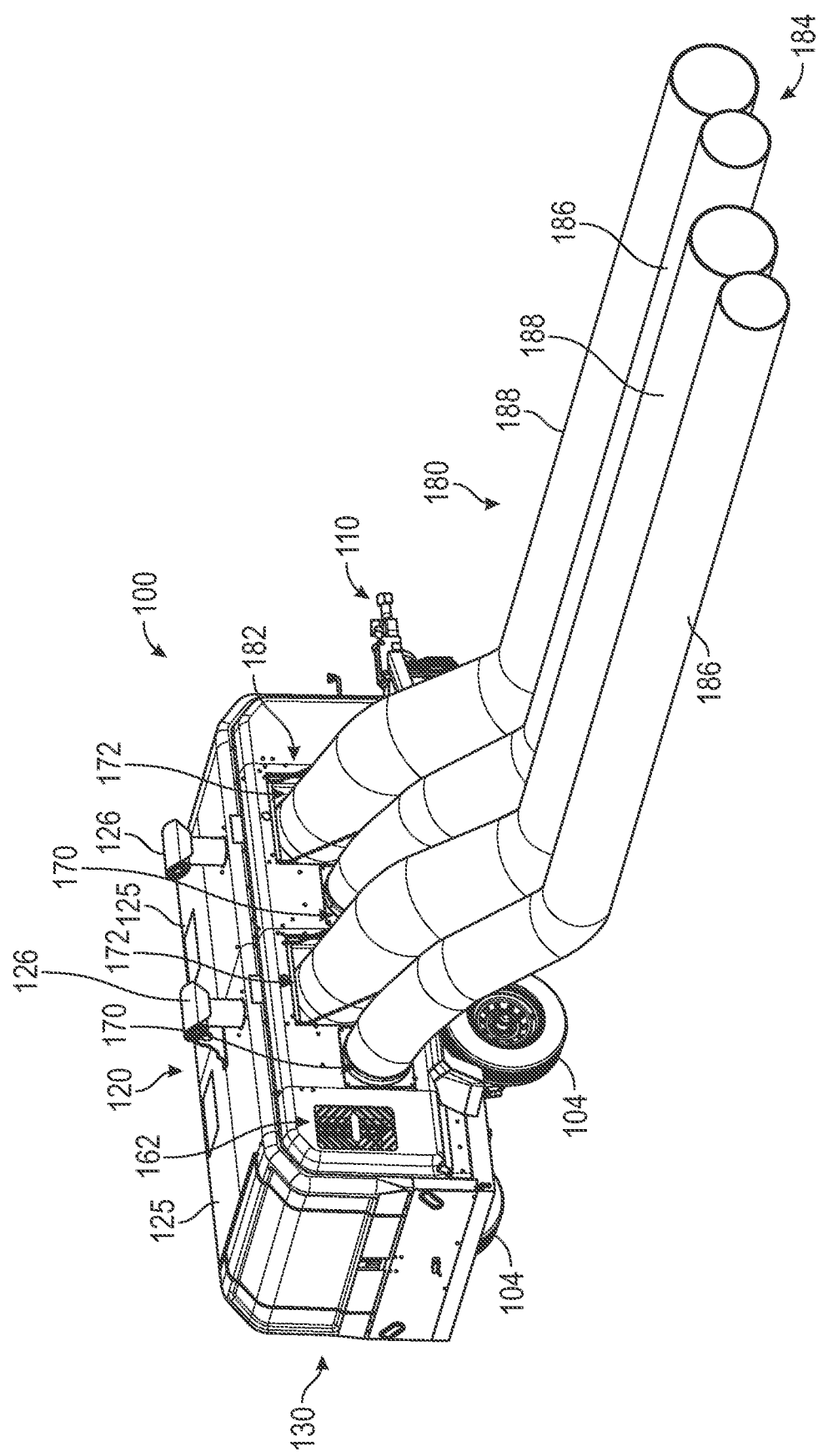
FIG. 5 is a perspective view of the mobile air heating equipment of FIG. 1 with ducts coupled to the adjustable duct mechanisms on the air inlet and air outlet locations shown in FIG. 3.

Referring now to FIG. 5, the portable air heating unit 100 is shown with ducts 180 attached. The ducts 180 are coupled to the portable air heating unit 100 at a duct coupler end 182 and are open at a duct free end 184. The ducts 180 include ducts of various sizes. In some embodiments, the ducts 180 include return ducts 186 and supply ducts 188. In some embodiments, the return ducts 186 and the supply ducts 188 have different sizes and proportions than those shown in FIG. 5. As shown in FIG. 5, the return ducts 186 are 16 inch diameter ducts, and supply ducts 188 are 20 inch diameter ducts. Each of the ducts 180 is coupled to a respective one of the adjustable duct mechanism 200 or the fixed duct coupler 178. In some embodiments, the ducts 180 are a same or similar size (e.g., a same or similar diameter, etc.).

In some embodiments, the duct free ends 184 of the supply ducts 188 may be routed to one or more conditioned spaces (e.g., a worksite, a workspace, a room, a building, etc.), and the duct free ends 184 of the return ducts 186 may be routed to the same conditioned space. In such embodiments, the return ducts 186 may return air mixed with heated air supplied by the portable air heating unit 100 (e.g., partially heated air) back to the portable air heating unit 100 to recirculate the partially heated air, which may ultimately reduce the required time to heat the air in a conditioned space while simultaneously reduce the amount of fuel required for achieving the heating. For example, instead of heating solely cold ambient air near the portable air heating unit 100, the portable air heating unit 100 may use the return ducts 186 to retrieve a quantity of air from the conditioned space, which would be warmer (e.g., have a higher average temperature) given its proximity to the supply ducts 188. In some embodiments, the return ducts 186 are not used and the portable air heating unit 100 draws air ambient to the portable air heating unit 100. In some embodiments, the on-board heating units 143 of the portable air heating unit 100 are indirect fired heaters which allow a high percentage of air to be recirculated without contamination from the heating method. For example, an indirect fired heater may ensure the products of combustion are exhausted through chimneys 126 and are not mixed with the heated air supplied by the portable air heating unit 100. In some embodiments, the air inlet areas 170 include a number of perforations to draw a mixture of ambient air near the portable air heating unit 100 and air returned by return ducts 186 to provide a supply of fresh air (e.g., non-recirculated air) to the portable air heating unit 100. The supply of fresh air may help to ensure that an acceptable quality of air (e.g., breathable, non-toxic, uncontaminated, non-noxious, non-lethal, etc.) is supplied to the conditioned area by the portable air heating unit 100.

Referring now to FIGS. 1-5, the portable air heating unit 100 may include one or more heating units (e.g., on-board heating equipment 143) of different sizes or configurations than shown. For example, the portable air heating unit 100 may include a first on-board heating equipment 143 having a capacity of 500,000 BTU, and a second on-board heating equipment 143 having a capacity of 250,000 BTU, and a third on-board heating equipment 143 having a capacity of 10,000 BTU. In some embodiments, the portable air heating unit 100 may include a single onboard heating equipment 143. In some embodiments, each on-board heating equipment 143 is arranged and configured differently than shown in FIGS. 1-5. For example, the positions, locations, and number of air inlet areas 170 and air outlet areas 172 may be different than shown in FIGS. 1-5. Specifically, the air inlets areas 170 and air outlet areas 172 may be positioned differently relative to each other (e.g., above, below, etc.) and/or may be located on other or separate portions of the portable air heating unit 100 (e.g., rear portion 130, access side 140, etc.), according to some embodiments. In some embodiments, the portable air heating unit 100 includes more than one air inlet area 170 and/or air outlet area 172 for each on-board heating equipment 143. It is contemplated that any air inlet area 170 or air outlet area 172 on portable air heating unit 100 may include an adjustable duct mechanism 200, according to some embodiments.

Figure 6:
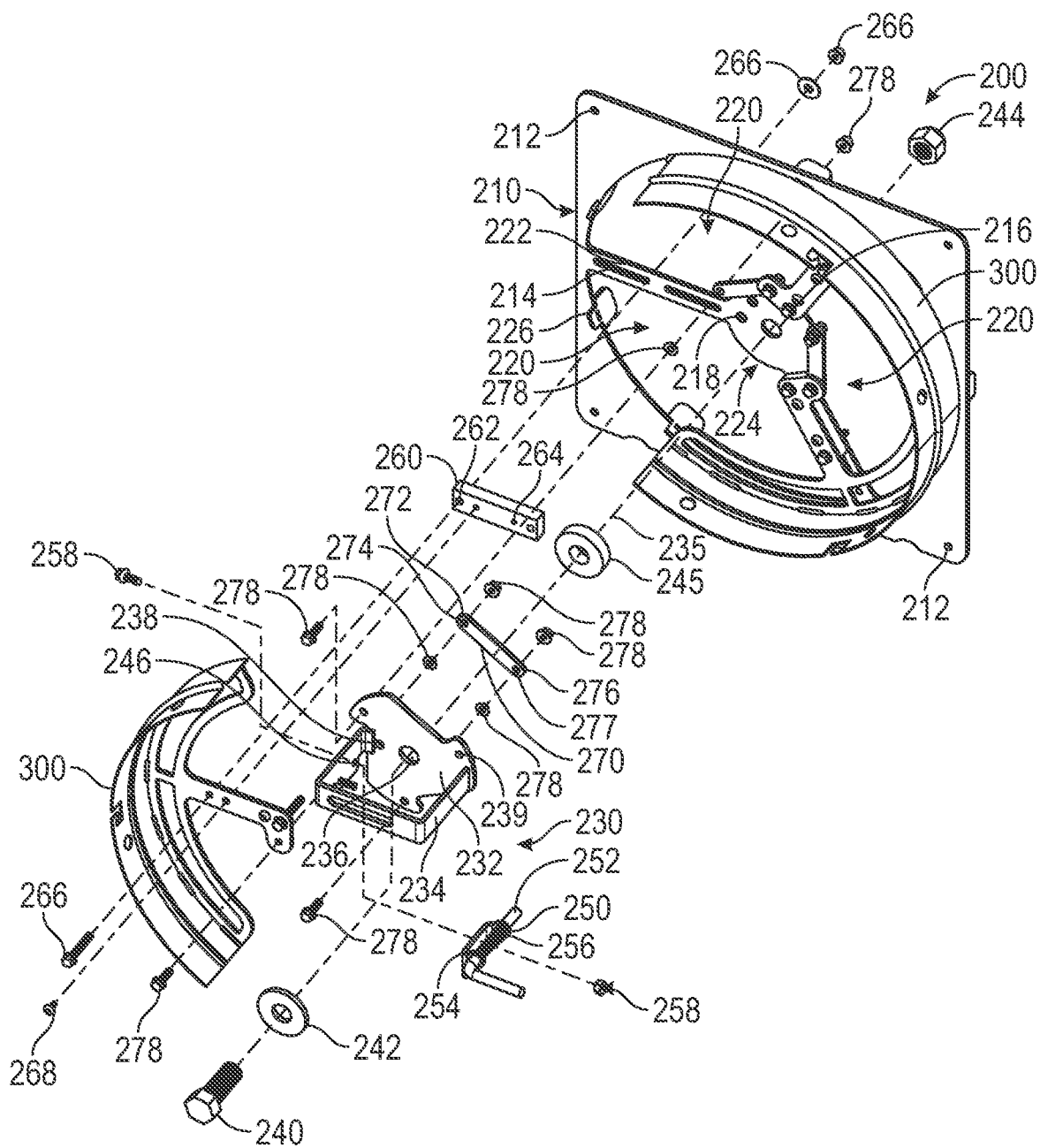
FIG. 6 is an exploded view of the adjustable duct mechanism of FIG. 3.

Referring now to FIG. 6, the adjustable duct mechanism 200 is shown in additional detail. It should be appreciated that although the following description is with reference to a single adjustable duct mechanism 200, it also applies to all the adjustable duct mechanisms 200 on the portable air heating unit 100. The adjustable duct mechanism 200 includes a base plate 210. In some embodiments, the base plate 210 includes mounting apertures 212. Mounting apertures 212 may be located in the corners of the base plate 210 and may be configured to facilitate fixedly coupling the base plate 210 to the portable air heating unit 100. For example, mounting apertures 212 may be configured to receive a threaded fastener, rivet, or other suitable fastener or fastening mechanism for securing base plate 210 to the side panel 175 of the portable air heating unit 100. In some embodiments, the base plate 210 is welded and/or riveted to the side panel 175 of the portable air heating unit 100.

The base plate 210 includes slide apertures 214 (e.g., slots, etc.) disposed on mounting plate arms 222. In some embodiments, the mounting plate arms 222 are defined as the portions of base plate 210 arranged circumferentially between adjacent pairs of main air apertures 220. In other words, the mounting plate arms 222 extend radially outwardly from a center portion or plate 224 to the base plate 210. In some embodiments, mounting plate arms 222 are sufficiently thin to provide a large cross sectional area for air to flow through base plate 210 (e.g., through main air apertures 220), but also sufficiently thick to provide stability and structural support to the center portion 224 and members coupled thereto. In some embodiments, the mounting plate arms 222 occupy an area less than about 25% of the total area through which air flows through the base plate 210.

In some embodiments, the slide apertures 214 extend radially outwardly from the center portion 224, which enables an outer body (e.g., ring arms) of the adjustable duct mechanism 200 to extend and retract radially to define different diameters as will be described herein. The slide apertures 214 are formed into the mounting plate arms 222 with a first one of the slide apertures 214 proximate the center portion 224 and a second one of the slide apertures 214 distal the center portion 224 (i.e., the slide apertures 214 are radially spaced along the respective mounting plate arms 222). In some embodiments, the slide apertures 214 are or include portions having different geometries (e.g., curved, s-shaped, etc.) to facilitate different desirable sliding or pivoting motions for members slidably engaged with the slide apertures 214. For example, a first slide aperture 214 may be curved and a second slide aperture 214 may be linear, and a ring arm 300 engaging both the first slide aperture 214 and the second slide aperture 214 may translate and rotate (e.g., pivot) as the ring arm 300 slides along the first slide aperture 214 and the second slide aperture 214.

In some embodiments, the center portion 224 includes a main pin aperture 216 and locking apertures 218. The main pin aperture 216 may be located at the center of the base plate 210 and a central axis 235 of the adjustable duct mechanism 200 extends through the main pin aperture 216. In some examples, locking apertures 218 are located around the main pin aperture 216 in a circular pattern concentric with the main pin aperture 216. As depicted, the base plate 210 includes two locking apertures 218 that correspond to a first locked position and a second locked position (e.g., the closed, first position 202 and the expanded, second position 204). In some embodiments, the base plate 210 includes more than two locking apertures 218 to facilitate locking an outer body or ring arms of the adjustable duct mechanism 200 in more than two positions, which would allow the adjustable duct mechanism 200 to accommodate more than two sizes of ducts. In some embodiments, the base plate 210 does not include locking apertures 218 and locking is achieved using a different mechanism (e.g., a ratcheting mechanism, a set screw, detents, etc.) which may allow locking in a plurality of positions.

Still referring to FIG. 6, the base plate 210 includes tabs 226 that extend axially outwardly from the base plate 210 at an outer periphery of the main air apertures 220. The tabs 226 may be welded to base plate 210 and may be located to provide a mechanical support (e.g., mechanical stop, rest, etc.) for the ring arms 300 in the second or closed position 202. In some embodiments, the adjustable duct mechanism 200 includes a handle 230. In some embodiments, the handle 230 includes a handle plate 232 and a handle bracket 234. In some embodiments, the handle plate 232 and the handle bracket 234 are fixedly coupled (e.g., welded together, bonded together), formed together (e.g., cast to define a unitary body, additively manufactured as a unitary body, etc.), or are removably coupled. The handle plate 232 includes a handle main pin aperture 236, a handle locking aperture 238, and link apertures 239. In some embodiments, the handle main pin aperture 236 is at the center of the handle plate 232. The handle main pin aperture 236 and main pin aperture 216 are concentric when the handle 230 and the base plate 210 are coupled and joined together by the main pin 240 (e.g., main bolt). In some embodiments, the main pin 240 includes a main pin washer 242 and a main nut 244. In some embodiments, the main nut 244 may be tightened or loosened to increase or decrease the frictional forces between the handle 230 and the base plate 210 to thereby increase or decrease the force (e.g., torque) required to rotate the handle 230 relative to the base plate 210 (e.g., rotate the handle 230 about an axis defined along the main pin 240). In some embodiments, the central axis 235 extends between the main nut 244 and handle main pin aperture 236. In some embodiments, the handle 230 and the base plate 210 are spaced by a main washer 245 (e.g., high density polyethylene washer, bushing, bearing, etc.) to reduce frictional forces between the surfaces of the handle 230 and the base plate 210.

In some embodiments, the handle bracket 234 includes locking mechanism mounting apertures 246 that are configured to facilitate coupling the locking mechanism 250 to the handle bracket 234. In some embodiments, the locking mechanism 250 includes a locking pin 252 supported by a locking mechanism bracket 254. In some embodiments, the locking pin 252 is biased into a protruding position (e.g., as shown in FIG. 6) by a locking mechanism spring 256. In some embodiments, the locking mechanism bracket 254 is configured to be mounted to the handle bracket 234 through locking mechanism fasteners 258. The locking pin 252 is configured to extend through both the handle locking aperture 238 and at least one of the locking apertures 218 in the biased protruding position to lock the handle 230 and the base plate 210 together in a angular position relative to the main pin 240 and central axis 235.

Still referring to FIG. 6, the adjustable duct mechanism 200 includes an outer body that is defined by one or more ring arms 300. In some embodiments, the adjustable duct mechanism 200 includes three ring arms 300, each extending between the center portion 224 and an outer periphery of the ring arm 300. In some embodiments, the adjustable duct mechanism 200 includes more or less than three ring arms 300. In some embodiments, each of the ring arms 300 defines an outer periphery that is shaped as a section of a circle. That is, the outer periphery of each of the ring arms 300 extend circumferentially about the central axis 235 and the outer peripheries of each of the ring arms 300 combine to form a diameter defined by the outer body as the adjustable duct mechanism 200 extends and retracts between the first position 202 and the second position 204.

In some embodiments, the ring arm 300 is configured to be coupled to the base plate 210 and the pad slide 260. In some embodiments, the pad slide 260 includes pad slide main apertures 262 and pad slide secondary apertures 264. The pad slide main apertures 262 are through holes that extend through the thickness of pad slide 260. The pad slide main apertures 262 may be configured to receive pad slide fasteners 266 that extend through the ring arm 300, the pad slide 260, and the slide apertures 214. In some embodiments, the pad slide secondary apertures 264 are blind holes and may be configured to receive pad fasteners 268 to fixedly couple the ring arm 300 to the pad slide 260. The pad slide 260 may be or include a friction reducing material (e.g., a low friction plastic, an oil, a lubricant, a graphite powder, a slippery material or coating) and may function as a wear reducing material between the ring arm 300 and the base plate 210. In some embodiments, the pad slide 260 may also function as a spacer to provide clearance for motion of the components of the adjustable duct mechanism 200 (e.g., link 270, handle 230, etc.). In some embodiments, the main washer 245 and the pad slide 260 have a same or similar thickness and same or similar material composition.

In some embodiments, each of the ring arms 300 is coupled to the handle 230 through the link 270 (e.g., arm, linkage, etc.). The link 270 includes a first end 272 having a first link aperture 274 and a second end 276 having a second link aperture 277. In some embodiments, the links 270 are pivotally coupled to the handle 230 and the ring arms 300 and are secured by link fasteners 278. The links 270 are configured to convert rotational motion of the handle 230 into linear motion of the ring arms 300 in the direction defined by the slide apertures 214. In some embodiments, a two or more bar linkage (e.g., a linkage having two or more links 270) may be used to convert rotational motion of handle 230 into desired linear and/or rotational motion of the ring arms 300 relative to the base plate 210. In some embodiments, the links 270 may be curved or angled between the first end 272 and the second end 276. In some embodiments, links 270 include more ends than shown. For example, link 270 may include three or more ends 272, 276 and may be triangular, rectangular, elliptical, or other suitable shapes having link apertures 274, 277 at ends 272, 276 or other locations on link 270 (e.g., center, middle, etc.)

Figure 7:
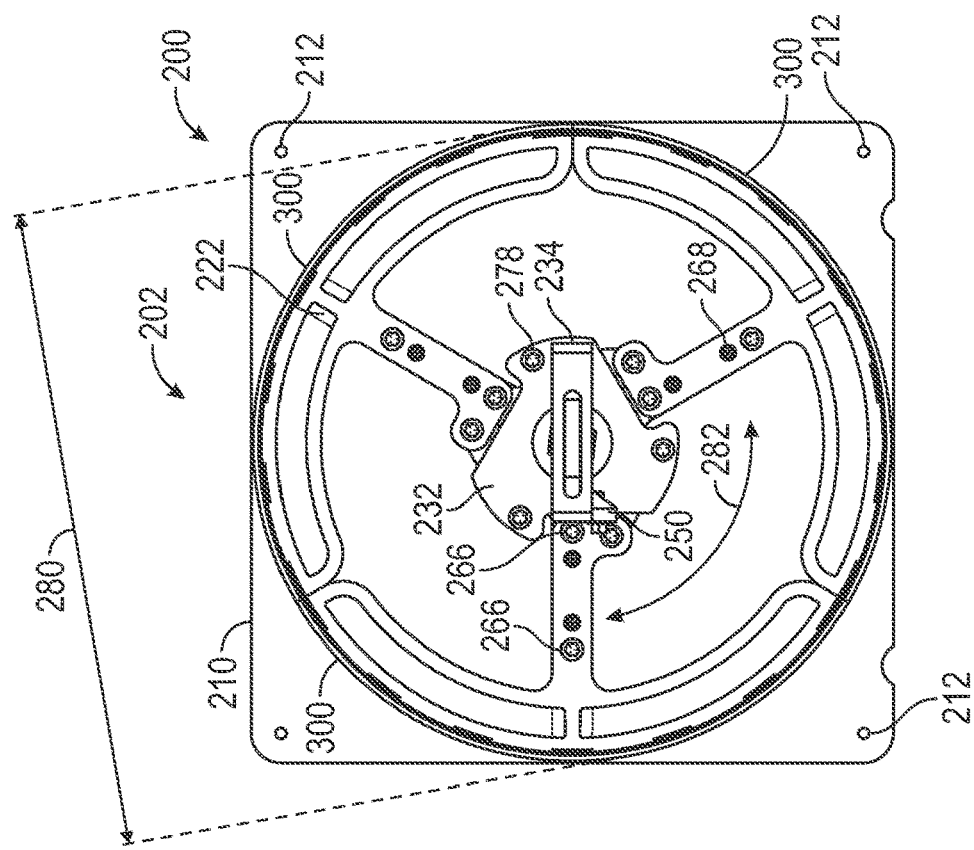
FIG. 7 is a front view of the adjustable duct mechanism of FIG. 3 in the first configuration.

Referring now to FIG. 7, the adjustable duct mechanism 200 is shown in the closed position 202. In some embodiments, the closed position 202 is defined as the position where the ring arms 300 are in a retracted (e.g., closed) position and the outer periphery of the ring arms 300 define a circular shape. In some embodiments, the outermost portions of the ring arms 300 define a shape other than a circular shape in the closed position 202 (e.g., a rectangular shape, a square shape, a triangular shape, an ovoid shape, a polygonal shape, etc.) to accommodate a different shape duct. The distance between the outermost portions of the ring arms 300 define a ring dimension or distance 280. In some embodiments, the ring dimension 280 defines the diameter of duct that may be coupled to the adjustable duct mechanism 200. In some embodiments, the ring dimension 280 in the closed position 202 is approximately 16 inches. In some embodiments, the ring dimension 280 may be greater than or less than 16 inches (e.g., 12 inches, 10 inches, 18 inches, 1 foot, 20 centimeters, etc.) in the closed position 202.

Figure 8:
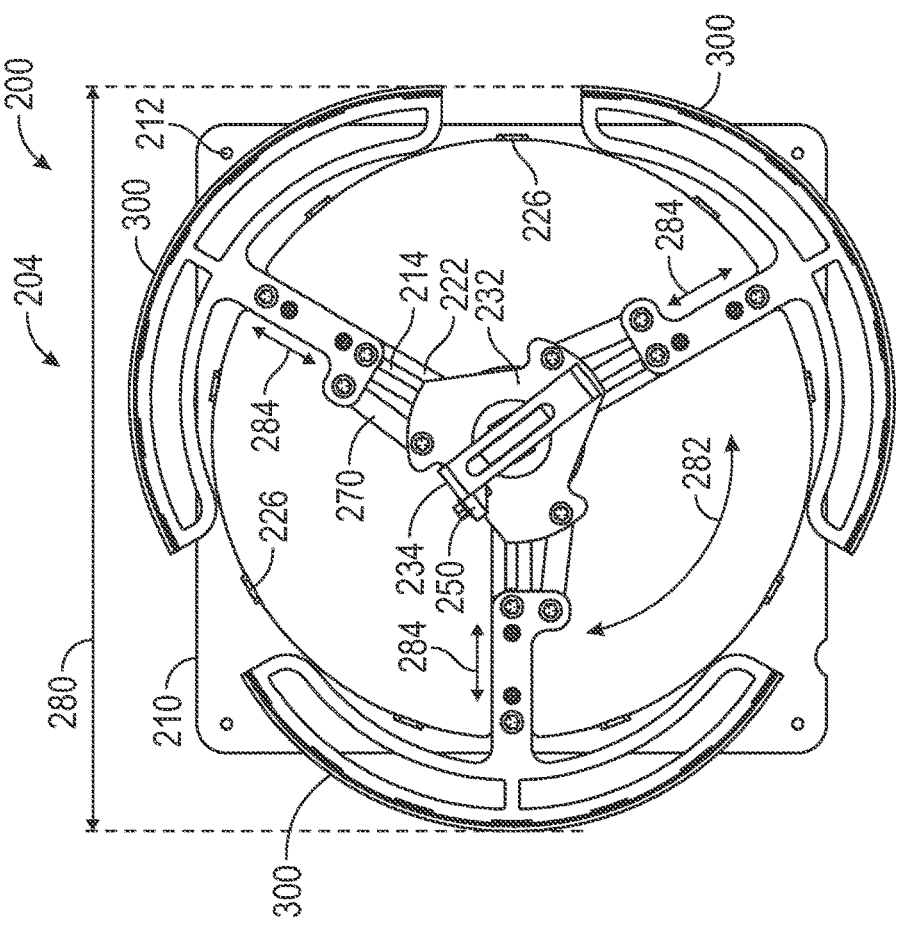
FIG. 8 is a front view of the adjustable duct mechanism of FIG. 3 in the second configuration shown in FIG. 4.

As shown in FIG. 8, the adjustable duct mechanism 200 is shown in the expanded (e.g., extended) position 204. In some embodiments, the expanded position 204 is defined as a position where the ring arms 300 are fully extended and not retracted. To reach the expanded position 204 from the retracted position 202, the handle 230 is rotated in a direction 282 (e.g., rotated about the main pin 240) and, in turn, the ring arms 300 are forced to translate (e.g., slide) in a direction 284 (e.g., the direction dictated by the path defined by the shape of the slide apertures 214) due to the rotational movement of the handle 230. In some embodiments, the ring arms 300 translate at least partially in a radial direction relative to the central axis 235 (e.g., direction 284). In some embodiments, the ring arms 300 translate at least partially in a radial direction and pivot to a position rotated relative to their respective position in the closed position 202. Advantageously, the position of ring arms 300 relative to the handle 230 can be adjusted via one-handed user input to the handle 230. For example, a user can grip the handle 230 and disengage the locking mechanism 250 (e.g., by lifting the locking pin towards the handle 230 with a finger), and simultaneously or subsequently apply a torque to the handle 230 to rotate the handle 230. In some embodiments, such rotation of the handle 230 about the central axis 235 effectuates a corresponding motion of the ring arms 300.

In some embodiments, the ring dimension or distance 280 is approximately 20 inches in the expanded position 204. In some embodiments, the ring dimension 280 may be greater than or less than 20 inches in the expanded position 204. In some embodiments, the adjustable duct mechanism 200 includes several expanded positions 204 with each correspond to a different ring dimension 280. For example, the closed position 202 may correspond to a 16 inch ring dimension 280, a first expanded position 204 may correspond to an 18 inch ring dimension, and a second expanded positon 204 may correspond to a 20 inch ring dimension. As discussed previously, the base plate 210 may include locking apertures 218 to facilitate locking the adjustable duct mechanism 200 in a number of discrete positions using the locking mechanism 250. In some embodiments, each locked position of the adjustable duct mechanism 200 can accommodate ducts of similar or larger sizes. For example, a closed position 202 having a ring diameter of 16 inches can accommodate an 18 inch diameter duct 180, depending on the duct coupler end 182 (e.g., a strap and clamp duct coupler end 182 can be cinched to fit on a smaller ring dimension 280 whereas a slip-lock duct coupler end 182 cannot be cinched and therefore requires a ring dimension 280 within a close tolerance to the diameter of the slip-lock duct coupler end 182). It is important to note that the values (e.g., 12 inches, 14 inches, 16 inches, 18 inches, 20 inches, etc.) of the ring dimensions 280 are illustrative and are not intended to be a comprehensive list of suitable values of the ring dimension 280.

Figure 9:
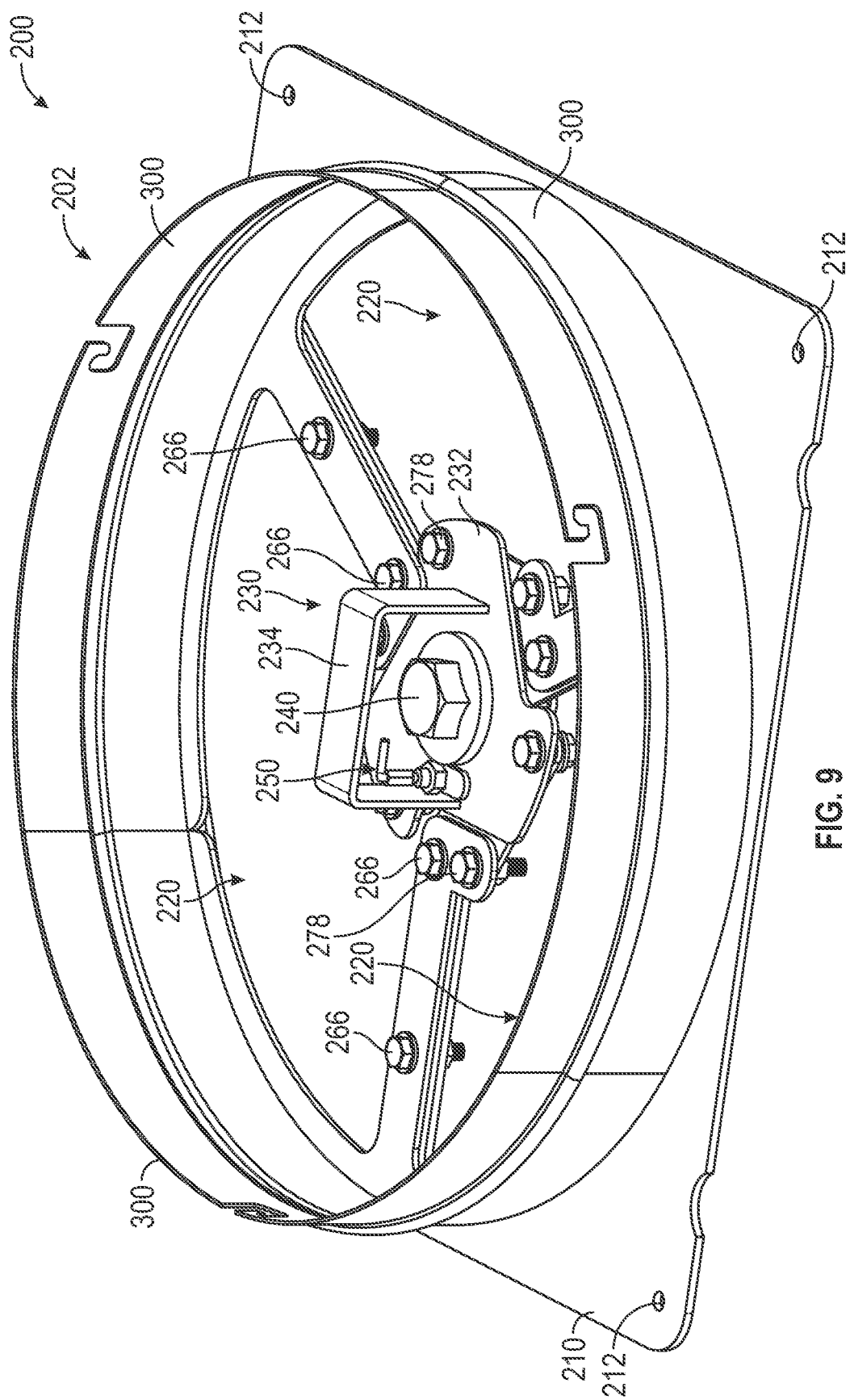
FIG. 9 is a perspective view of the adjustable duct mechanism of FIG. 3 in the first configuration shown in FIG. 7.

Referring now to FIG. 9, the adjustable duct mechanism 200 is in the closed position 202. The locking mechanism 250 is in the protruding position and the locking pin 252 is engaging the locking apertures 218, according to some embodiments. The handle 230 is locked from rotating and the ring arms 300 are locked. An operator may overcome the bias of the locking mechanism 250 (e.g., the bias provided by the locking mechanism spring 256) to retract (e.g., disengage) the locking pin 252 from the locking aperture 218 to allow the handle 230 to rotate in the direction 282. As shown in FIG. 9, the base plate 210 does not include tabs 226. In some embodiments, the base plate 210 may not include tabs 226, which may reduce manufacturing costs and complexity of assembly.

Figure 10:
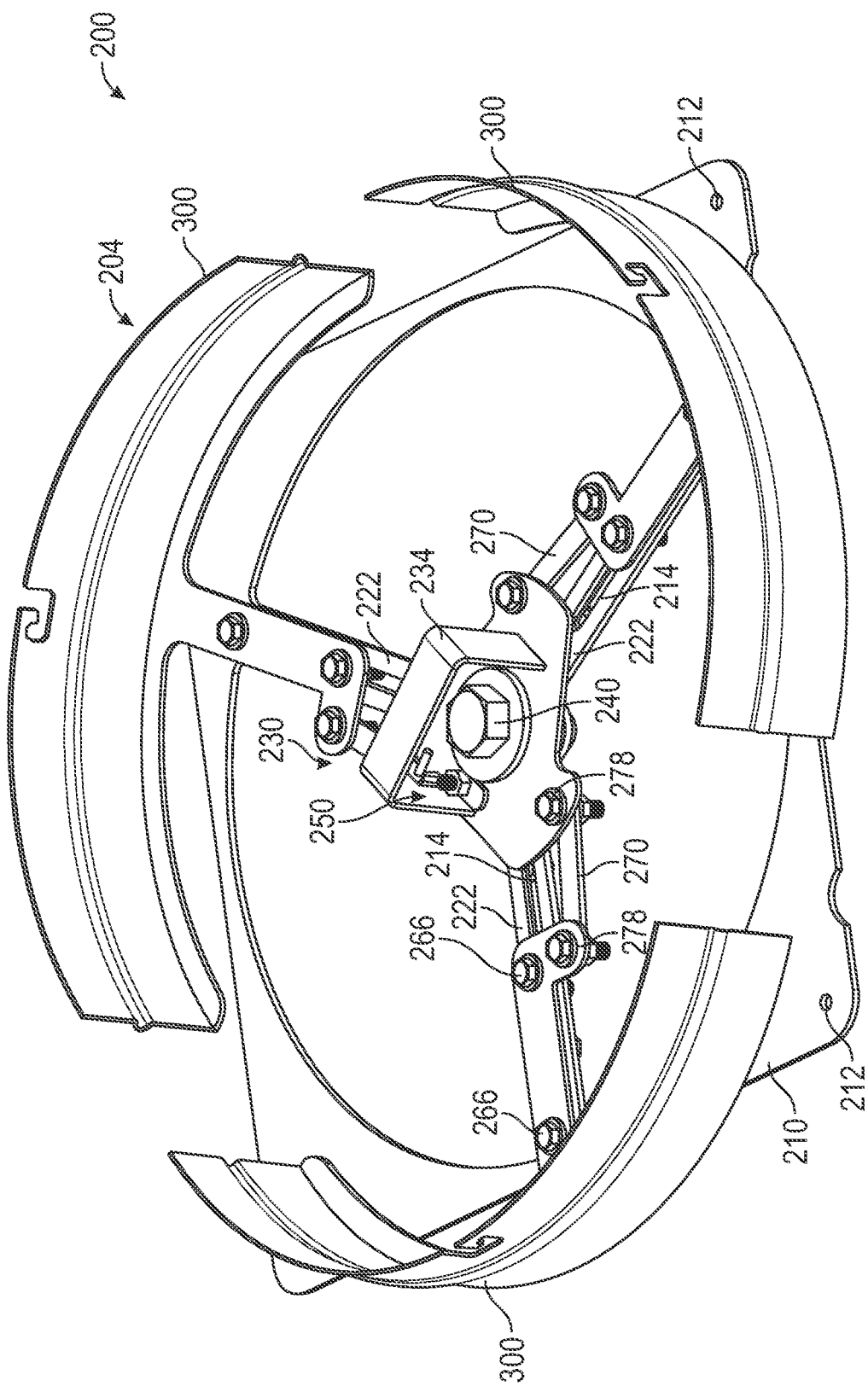
FIG. 10 is a perspective view of the adjustable duct mechanism of FIG. 3 in the second configuration shown in FIG. 8.

Referring now to FIG. 10, the adjustable duct mechanism 200 is in the expanded position 204. The locking mechanism 250 is in the protruding position and the locking pin 252 is engaging the locking apertures 218. The handle 230 is locked from rotating and the ring arms 300 are also locked. In some embodiments, some or all of the adjustable duct mechanism 200 is at least partially made of a material suitable for use in environments subjected to rapid and large changes in temperature. For example, some or all of the adjustable duct mechanism 200 may be made of metal (e.g., aluminum, steel, stainless steel, etc.), a metal alloy (e.g., brass), a ceramic, or other materials having a relatively low thermal sensitivity (e.g., materials having a low thermal expansion coefficient, a softening point above the maximum temperature of the air supplied by the portable heating device 100). For example, the base plate 210 is formed of a material that is not sensitive to a large temperature gradient (e.g., on a spatial basis, on a time basis) that can take place between portions of the base plate 210 positioned within the flow of heated air (e.g., the center portion 224 and mounting plate arms 222) and the outer edge portions of the base plate 210. For example, the heated flow of air may drive the temperature of the center portion 224 to a temperature different than (e.g., greater than) the temperature of the air ambient the edge portions of the base plate 210, and, depending on the thermodynamic properties (e.g., mass, thermal capacitance, conductivity, heat transfer properties, etc.) of the base plate 210 and air proximate the base plate 210 (e.g., ambient air proximate the mounting apertures 212 and the flow of heated air through the main air apertures 220), the change in temperature may occur rapidly. Advantageously, the material(s) of the adjustable duct mechanism 200 resist weakening (e.g., softening, deforming, relaxing, cracking, fracturing, etc.) and/or dimensional changes (e.g., thermal expansion or contraction) that can detriment the functionality and utility of the adjustable duct mechanism 200 and operations of the portable heating equipment 100.

Referring now to FIGS. 11-13, one of the ring arms 300 is shown, according to some embodiments. The following description applies to each of the ring arms 300 in each of the adjustable duct mechanism 200. In some embodiments, the ring arm 300 includes a flange portion 302 and a plate portion 304. In some embodiments, the flange portion 302 is the outermost portion of the ring arm 300. In some embodiments, the flange portion 302 includes duct coupling features 306. The duct coupling features 306 include a j-slot 308, flange apertures 310, and flange ridge 312 (e.g., bead, rib, etc.). In some embodiments, the duct coupling features 306 are configured to be engaged by the duct coupler end 182. In some embodiments, the duct coupler end 182 is at least one of a strap and clamp coupler, slip-lock coupler, or other duct coupler suitable for coupling duct coupler end 183 configured to interface with the duct coupling features 306. In some embodiments, the flange ridge 312 may facilitate a secure seal when a strap and clamp duct coupler end 182 is used. In some embodiments, the j-slot 308 may provide a secure mounting location when a slip-lock duct coupler end 182 is used. The plate portion 304 includes ring arm main pad slide apertures 320 and ring arm secondary pad slide apertures 322. In some embodiments, the ring arm main pad slide apertures 320 may be configured to receive the pad slide fastener 266. In some embodiments, the ring arm secondary pad slide apertures 322 are configured to receive the pad fasteners 268. In some embodiments, the plate portion 304 includes a ring arm link aperture 324. In some embodiments, the ring arm link aperture 324 is configured to receive a link fastener 278 to couple the ring arm 300 with the link 270. In some embodiments, the plate portion 304 is fixedly coupled (e.g., welded) to the flange portion 302 by welds 330. In some embodiments, the plate portion 304 is offset from the edge of the flange portion 302 by tab height 323 which facilitates the flange portion 302 engaging the tabs 226 in the closed position 202.

Figure 14:
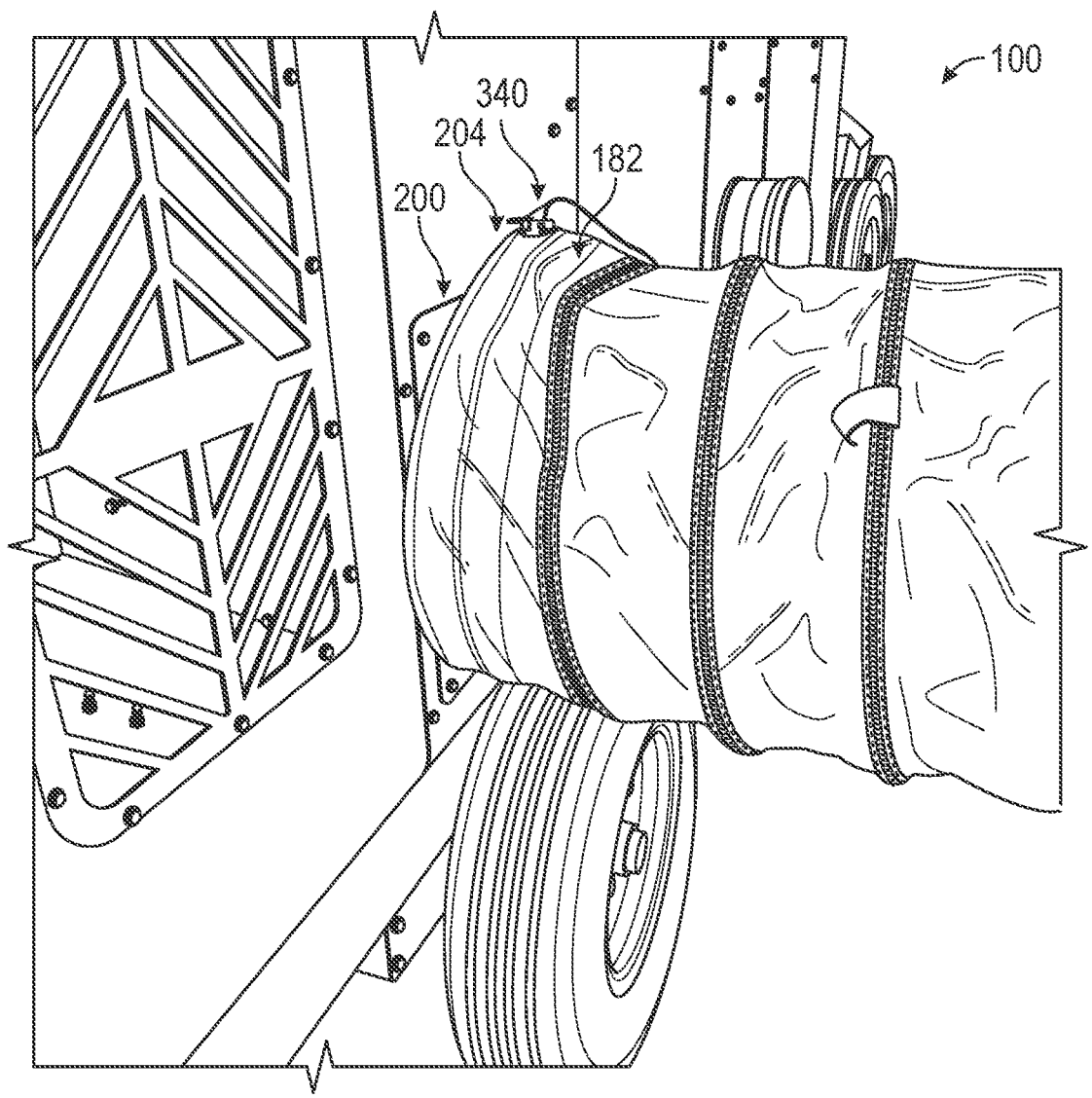
FIG. 14 is a perspective view of a duct attached to the adjustable duct mechanism of FIG. 3 in the second configuration shown in FIG. 8.
Figure 15:
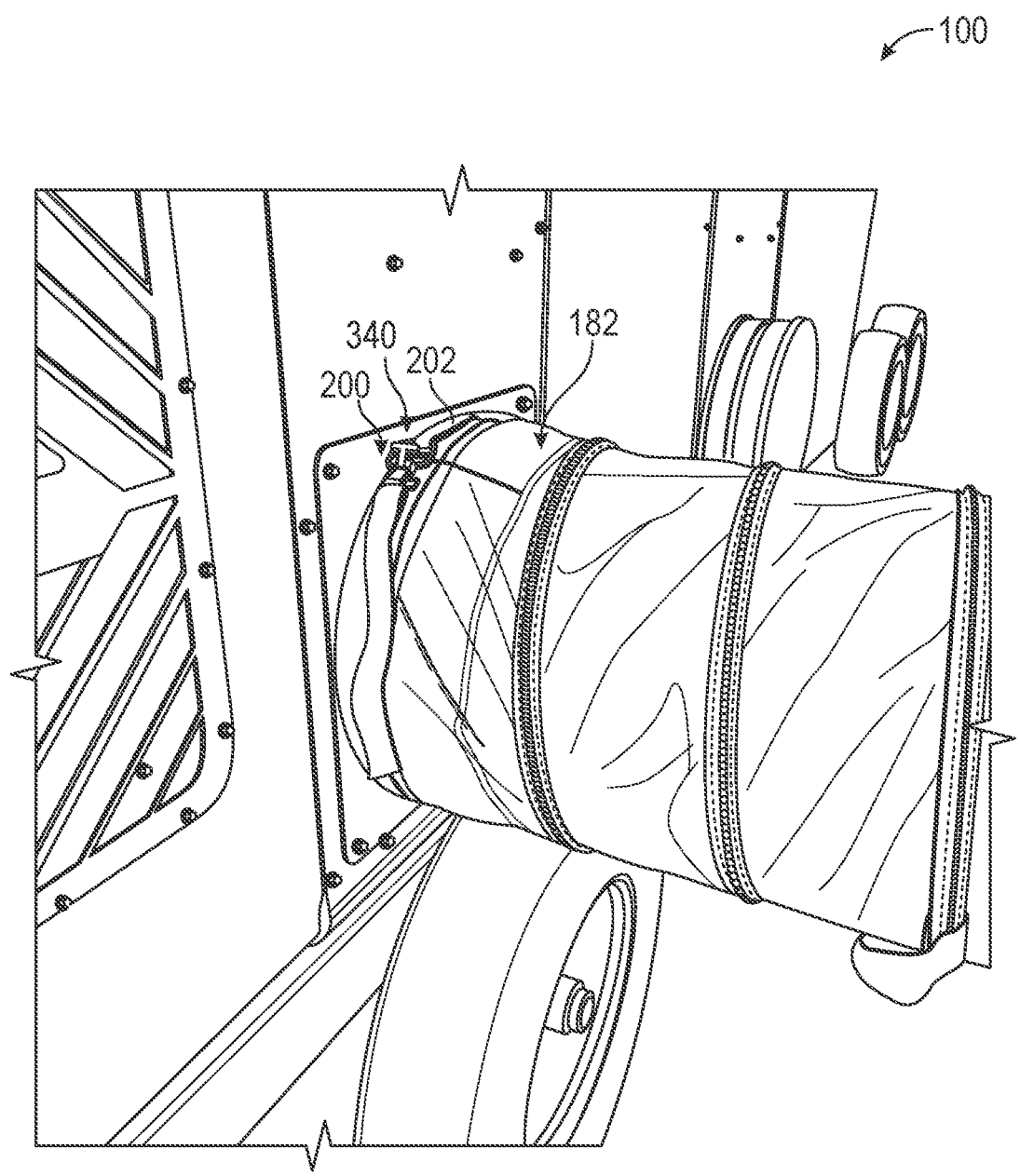
FIG. 15 is a perspective view of a duct attached to the adjustable duct mechanism of FIG. 3 in the first configuration shown in FIG. 7.

Referring now to FIG. 14, the duct coupler end 182 of the return duct 186 is coupled to the adjustable duct mechanism 200 in the expanded position 204. The duct coupler end 182 includes a strap and clamp fastener 340 and is engaging duct coupling features 306 (i.e., the outer periphery of the rings arms 300). Referring now to FIG. 15, the duct coupler end 182 of the return duct 186 is coupled to the adjustable duct mechanism 200 in the closed position 202. The duct coupler end 182 includes a strap and clamp fastener and is engaging duct coupling features 306. As shown in FIG. 15, duct coupler end 182 is a 16 inch duct. Accordingly, the adjustable duct mechanism 200 can accommodate at least two different sizes of ducts. In some embodiments, the duct coupler end 182 seals with the adjustable duct mechanism 200. For example, the duct coupler end 182 may be coupled to the adjustable duct mechanism 200 such that fluid (e.g., air) is prevented from passing through an interface between the adjustable duct mechanism 200 and the duct coupler end 182.

Referring again to FIG. 3, in some embodiments, each air inlet area 170 and air outlet area 172 include an adjustable duct mechanism 200 to accommodate a specific size of duct (e.g., a 10 inch diameter duct, a 12 inch diameter duct, a 14 inch diameter duct, a 16 inch diameter duct, a 18 inch diameter duct, a 20 inch diameter duct, a 21 inch diameter duct, etc.). In some embodiments, one or more of the air inlet areas 170 and/or the air outlet areas 172 include an adjustable duct mechanism 200. For example, one air inlet area 170 may include an adjustable duct mechanism 200 and the remaining air inlet areas 170 and air outlet areas 172 may utilize fixed duct couplers 178. In some embodiments, one of the air inlet areas 170 includes an adjustable duct mechanism 200 in a closed position 202 and another of the air inlet areas 170 include an adjustable duct mechanism 200 in an open position 204, which enables each of the air inlet area 170 to accommodate different sized ducts.

Referring again to FIG. 5, in some embodiments, the ducts 180 may have a single duct coupler end 182 and one or more duct free ends 184. For example, a 20 inch diameter duct may be split into one or more duct free ends 184 (e.g., two 14 inch duct free ends 184). In some embodiments, the ducts 180 are tapered and are larger at an end (e.g., duct coupler end 182 or duct free end 184). In some embodiments, the duct free end 184 is smaller than the duct coupler end 182 when the duct 180 is coupled to the air outlet area 172 to increase the flow velocity of heated air exiting the duct at the duct free end 184. In some embodiments, the increase in flow velocity can be approximated using a Bernoulli equation under certain assumptions. In some embodiments, an increased flow velocity exiting the duct free end 184 may promote better mixing of heated air expelled by duct free end 184 with air at the conditioned space (e.g., worksite, engine compartment to be heated, etc.) to provide a more uniform temperature across the conditioned space.

Referring again to FIGS. 7-8, although adjustable duct mechanism 200 is shown with three ring arms 300, it is contemplated that more or fewer ring arms 300 may be used to achieve the desired ring dimension 280 and shape for coupling a duct to portable air heating unit 100. For example, adjustable duct mechanism 200 may include two ring arms 300 that extend away from each other in opposite directions (e.g., opposite and radially from the central axis 235). In some embodiments, a single ring arm 300 may be used and a fixed duct flange may be present on a portion of the base plate 210. In some embodiments, the handle 230 does not include a handle bracket 234 as shown and may include additional gears, mechanisms, levers, or lever arms. In some embodiments, handle 230 may be geared and several rotations of the handle 230 may be required to extend the ring arms 300 from the closed position 202 into the expanded position 204.

In some embodiments, the ring arms 300, the handle 230, and the base plate 210 are made of metal (e.g., steel, aluminum, a metal alloy, etc.). In such embodiments, the ring arms 300, the handle 230, and the base plate 210 may be suitable for use at high temperatures and will not deform or fail when exposed to extreme heat (e.g., compared to a thermoplastic or other heat-sensitive material). It is worth noting that adjustable duct mechanism 200 have different proportions than shown. For example, the main air apertures 220 may be proportionately larger or smaller than shown. In some embodiments, the base plate 210 is not square and may be oval, circular, or any other suitable shape. In some embodiments, the adjustable duct mechanism 200 is not symmetrical and each ring arm 300 may be sized and shaped differently from each other.

Although the adjustable duct mechanism 200 has been described with respect to portable air heating unit 100, it is contemplated that adjustable duct mechanism 200 may be implemented on any equipment or device that utilizes ducts and ductwork. For example, adjustable duct mechanism 200 may be implemented on an air handling unit, a ventilating unit (e.g., ventilation fan), an air cooling unit, etc. It is also contemplated that adjustable duct mechanism 200 may be used on stationary equipment such as heating, ventilating, or cooling (HVAC) equipment.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that any element disclosed in one embodiment may be incorporated or utilized with any other embodiment disclosed herein. For example, the tabs 226 of the exemplary embodiment shown in FIGS. 6-8 may be incorporated in the adjustable duct mechanism 200 of the exemplary embodiment shown in FIGS. 9-10. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. Outdoor power equipment, comprising:
   a frame supported by a plurality of wheels; and
   an air heating system comprising:
      an air inlet;
      an air outlet;
      a heating device configured to heat the air between the air inlet and the air outlet; and
      an adjustable duct connector fixedly coupled to at least one of the air inlet and the air outlet, the adjustable duct connector comprising:
         a base plate;
         a ring arm slidably coupled to the base plate;
         a handle rotatably coupled to the base plate and the ring arm, wherein rotation of the handle selectively transitions the ring arm between a first position proximate the handle and a second position arranged further from the handle; and
         a locking mechanism configured to secure the ring arm in the first position and the second position.

2. The outdoor power equipment of claim 1, wherein an outermost portion of the ring arm in the first position defines a first distance, and wherein the outermost portion of the ring arm in the second position defines a second distance, and wherein the second distance is greater than in the first distance.

3. The outdoor power equipment of claim 2, wherein the first distance is a first diameter and the second distance is a second diameter.

4. The outdoor power equipment of claim 1, wherein the ring arm is coupled to the handle through at least one linkage.

5. The outdoor power equipment of claim 1, wherein the base plate further comprises one or more tabs configured to support the ring arm in the first position.

6. The outdoor power equipment of claim 1, wherein the ring arm includes a flange portion having an aperture, a slot, or a ridge that is configured to facilitate coupling a duct to the ring arm.

7. The outdoor power equipment of claim 1, wherein the locking mechanism is coupled to the handle, the locking mechanism comprising a pin that is biased to selectively engage locking apertures in the base plate to secure the ring arm in the first position and the second position.

8. The outdoor power equipment of claim 1, wherein an outer periphery of the ring arm and defines at least a section of a circular shape in the first position.

9. The outdoor power equipment of claim 1, wherein the ring arm comprises a plurality of ring arms arranged circumferentially around the adjustable duct connector, wherein rotation of the handle selectively transitions each of the plurality of ring arms between the first position and the second position.

10. Outdoor power equipment, comprising:
- an air inlet;
- an air outlet;
- a fan configured to draw air through the air inlet and expel the air through the air outlet;
- a heating device configured to heat the air between the air inlet and the air outlet; and
- an adjustable duct connector fixedly coupled to at least one of the air inlet and the air outlet, the adjustable duct connector comprising:
  - a base plate including a center portion and a plurality of plate arms extending radially outwardly from the center portion;
  - a plurality of ring arms, each being movably coupled to a respective one of the plurality of plate arms; and
  - a handle rotatably coupled to the center portion and each of the plurality of ring arms, so that each of the plurality of ring arms translates along the respective one of the plate arms, in response to selective rotation of the handle, between a first position where an outer periphery of the plurality of ring arms defines a first diameter and a second position where the outer periphery of the plurality of ring arms defines a second diameter, wherein the second diameter is greater than the first diameter.

11. The outdoor power equipment of claim 10, wherein each of the plurality of ring arms is coupled to the handle through at least one linkage.

12. The outdoor power equipment of claim 10, the adjustable duct connector further includes a locking mechanism configured to secure the plurality of ring arms in the first position and the second position.

13. The outdoor power equipment of claim 12, wherein the locking mechanism is coupled to the handle, the locking mechanism comprising a pin that is biased to selectively engage locking apertures in the base plate to secure the plurality of ring arms in the first position and the second position.

14. The outdoor power equipment of claim 10, wherein each of the plurality of ring arms includes a flange portion having an aperture, a slot, or a ridge that is configured to facilitate coupling a duct to the ring arms.

* * * * *